S. Cooke,
Spice Box.
No. 102,225. Patented Apr. 26, 1870.
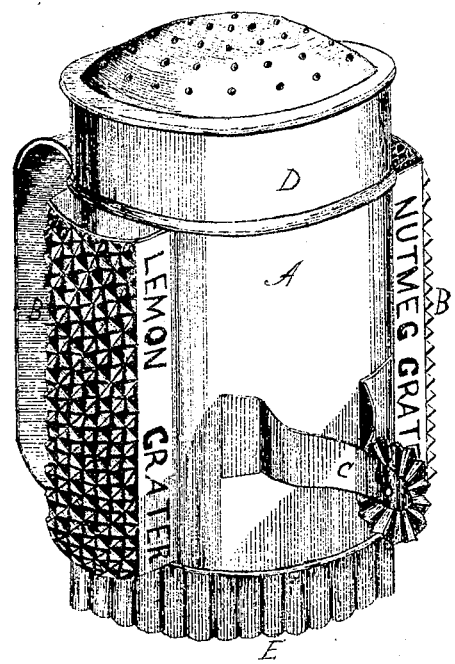
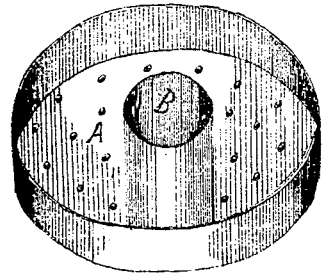
FIG. 2.
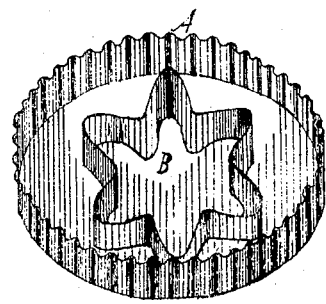
FIG. 3.
Witnesses.
Louis W. Frost
John F. Baker
Sydney Cooke.

United States Patent Office.

SYDNEY COOKE, OF BAYONNE CITY, NEW JERSEY, ASSIGNOR TO HIMSELF AND FREDERICK C. BULKLEY, OF BROOKLYN, N. Y.

Letters Patent No. 102,225, dated April 26, 1870.

IMPROVED DREDGE-BOX, CAKE-CUTTER AND GRATER.

The Schedule referred to in these Letters Patent and making part of the same.

*To all whom it may concern:*

Be it known that I, SYDNEY COOKE, of Bayonne City, in the county of Hudson and State of New Jersey, have invented a new and useful Improvement in Dredge-Boxes for Cooking Purposes; and that the following is a full and exact description of the same, reference being had to the accompanying drawings which are made a part of this specification, in which—

Figure 1 is a full view of my improved dredge-box with a combination of five articles attached.

Figure 2 represents the lid of the box as a doughnut-cutter.

Figure 3 represents the bottom of the box, as a cake-cutter.

The nature of my invention consists in a new and useful improvement in dredge-boxes for cooking purposes, with a combination of five articles attached, making it a useful and convenient article for cooking purposes.

To enable others skilled in the art to make and use my invention, I will describe its construction and operation.

In fig. 1, A may represent the dredge-box B B, the raised graters which are attached to the sides of the box, one being used for nut megs, and the other for lemons, &c. The grates being raised from the surface of the box prevent the holes in them from getting clogged.

C, represents the jagger iron or knife, which is attached to the front of the box.

D represents the lid and doughnut-cutter.

E represents the corrugated cake-cutter, attached to the bottom of the box.

In figure 2, A represents the inside of the cutter, and B, the hollow tube in the center of the cutter, which cuts the hole in the doughnut.

In fig. 3, A represents the corrugated edge of the cutter, and

B the fancy stamp that marks the top of the cake.

Having thus fully described my improvement,

What I claim, and desire to secure by Letters Patent of the United States, is—

An improvement in dredge-boxes for cooking purposes, whereby I combine the five following articles in one, viz, the doughnut-cutter, cake-cutter, jagger-iron or knife, and the raised graters, all of which articles are attached to the box, substantially as and for the purpose set forth.

To the above specification of my invention, I have signed my hand this twenty-first day of March, A. D. 1870.

SYDNEY COOKE.

Witnesses:
 LOUIS W. FROST,
 CHARLES G. COE.